3,015,648
EPOXIDE RESIN COMPOSITION
Elizabeth S. Lo, Fords, N.J., assignor to Johnson &
Johnson, a corporation of New Jersey
No Drawing. Filed Oct. 31, 1958, Ser. No. 770,934
16 Claims. (Cl. 260—47)

This invention relates to novel curable epoxy resins having improved solvent resistance and improved heat distortion properties.

As is well known to those familiar with organic and plastic compositions, considerable work has been done on the development of curable epoxy resins useful in many industries such as coating, molding compositions, etc. These epoxy resins in general are formed by the reaction of a polyhydric compound with an epihalohydrin in an alkaline medium. Although many of the hereintofore known epoxy resins possess a number of desirable physical characteristics, very often they lack either one or both the resistance to solvents and the resistance to distortion at elevated temperatures.

Accordingly it is an object of this invention to provide a novel method for the production of curable epoxy resins having improved resistance to solvents and improved resistance to distortion at elevated temperatures. A further object of the invention is to provide novel curable epoxy resins having improved resistance to distortion at elevated temperature.

It has been found that the above objects may be realized by reacting in an alkaline medium a halohydrin of the epihalohydrin or polyhalohydrin type with a phenol-condensation product of the type described hereinafter and a dihydric phenol. In general, the halohydrin ether is in a molar ratio of at least 1.5 to 15 parts to 1 part of the combined weight of phenol-condensation product and dihydric phenol. In general, for each combined mole of phenol-condensation product and dihydric phenol, the condensation product is in an amount from 5 to 95 mole percent, and preferably 15 to 95 mole percent. In general, the reaction is carried out at a temperature in the range of about 50 to about 150° C., and preferably about 80 to about 130° C., for a time in the range of about ⅓ hour to about 7 hours, and preferably of about 1 to about 5 hours. Of course, the higher reaction temperature employed the lower reaction time required.

The phenol-condensation products used in accordance with this invention are those formed by reacting in alkaline medium a phenol with a cyclic anhydride or a dibasic acid which under the proper conditions forms a cyclic anhydride, the molar ratio of phenol to dibasic anhydride being at least 2:1.

The phenol-condensation products used in accordance with this invention may be prepared according to the method described by Dass, Tewari and Dutt, Proc., Indian Acad. Sci. 13 A 68 (1941) and 14 A 158 (1941). More particularly the condensation products are prepared by reacting a phenol type compound selected from the group consisting of phenols and substituted phenols, such, for example, as alkylated phenols, arylated phenols and halogenated derivatives of the foregoing with a compound selected from the group consisting of phthalic, maleic, succinic, naphthalic and sulfonephthalic acids and anhydrides as well as substituted derivatives thereof such, for example, as alkylated and halogenated derivatives of the foregoing. In this reaction the molar ratio of the phenol to the dibasic anhydride or acid is at least 2:1. These condensation products in general are of the following structures:

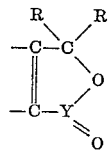

or

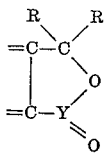

where R is a radical selected from the group consisting of a hydroxy phenyl radical and substituted derivatives thereof such, for example, as alkylated and halogenated derivatives and Y is selected from the group consisting of C atom and S atom.

Examples of phenol condensation products of the aforementioned type used in accordance with this invention are phenol-phthalein (reaction product of phenolphthalic anhydride), cresolphthalein (reaction product of cresol-phthalic anhydride), phenolmalein (reaction product of phenol nad maleic anhydride), thymolsulfonephthalein (reaction product of thymol and sulphonephalic anhydride), orthocresolsulfonephthalein (reaction product of orthocresol and sulphonephthalic anhydride), cresolmalein (reaction product of cresol and maleic acid), phenolsuccein (reaction product of phenol and succinic anhydride), and phenol-naphthalein (reaction product of phenol and naphthalic anhydride).

Examples of dihydric phenols used in accordance with this invention are mononuclear phenols like resorcinal, cathechol, hydroquinone, etc. or polynuclear phenols like bis - (4 - hydroxyphenyl) - 2,2 - propane, 4,4' - dihydroxybenzophenone, bis-(4-hydroxyphenol)-1,1-ethane, bis-(4-hydroxyphenol)-1,1-isobutane, bis-(4-hydroxyphenol)-2,2-butane, bis-(4-hydroxy-2-methylphenyl)-2,2-propane, bis-(4-hydroxy-2-tertiary-butylphenyl)-2,2-propane, bis-(2-hydroxynaphthyl)-methane, 1,5-dihydroxynaphthalene, etc.

Examples of halohydrins useful in producing epoxy resins in accordance with this invention are dihalohydrins such, for example, as dichlorohydrins as exemplified by bis-(3-chloro-2-hydroxy propyl) ether, 1,4-dichloro-2,3-dihydroxy butane, 1,4-dihydroxy-2,3-dichloro butane, 1,4-dihydroxy-2,3-dichloro butane, 1,4-dichloro-2,3-dihydroxy cyclohexane and dihalohydrins derived from divinyl benzenes, for example, by the addition thereto of two mols of hypohalous acids, etc. Also useful in forming epoxy resins in accordance with this invention are epihalohydrins such, for example, as epichlorohydrin.

The epoxy resins, or what may be designated "coepoxy resins" formed in accordance with this invention are glycidyl ethers and esters. The molecular weights of these glycidyl ethers and esters vary with the amount of halohydrin and also with the reaction conditions. Upon addition of less than or nearly equivalent amount of the halohydrin to the aforementioned mixture of phenol condensation product and dihydric phenol, a high molecular weight co-epoxy resin is obtained. By using larger amounts of halohydrin lower molecular weight products are obtained. The co-epoxy ring is extremely sensitive toward water in presence of alkaline materials. Some hydrolysis occurs even at a water concentration of 2%. The saponification value is proportional to the amount of phenol condensation product present in the co-epoxy resins of the invention.

The co-epoxy resins formed in accordance with this invention are either viscous liquids, or solids. These novel epoxy resins are particularly useful as protective coatings and as insulating materials, potting compositions, and encapsulating material for electrical systems. They can be cured to rigid thermosetting resins by any of the epoxy resin curing agents, such, for example, as amines, polybasic acids or anhydrides with or without heating. Examples of suitable amine hardeners for the epoxy resins of this invention are: methane, diamine, phenylene diamines, ethylene diamine, triethylene tetramine, dianiline sulfone, dianilinemethane, dimethyl ethanolamine, dimethyl aminopropionitrile, benzyl dimethylamine, dimethyl aniline and methyl diethanolamine. Typical acid and anhydride hardeners which may be employed are: dodecyl succinic anhydride, pryomellitic dianhydride, boron trifluoride phthalic anhydride and hexahydrophthalic anhydride.

The following Examples 1–10 illustrate the manufacture of the co-epoxy resins of the present invention. These examples are merely for the purpose of illustrating the invention but the invention is in no way limited thereto.

*Example 1*

A mixture of bisphenol A (23.1 g.) and phenolphthalein (96.9 g.) in the molar ratio of 25 to 75, respectively, was suspended in epichlorohydrin (225 g.) and placed in a 1-l. reaction flask equipped with a mechanical stirrer, a dropping funnel, a thermometer and a vapor take-off to which was fitted a water-cooled condenser, and a condensate collector. An aqueous solution containing 32.5 g. of NaOH in 33 cc. of water was dropped in the reaction flask at such a rate that the pot temperature remained between 100–117° C. during the half hour of addition. All during the addition the azeotropic mixture of water and epichlorohydrin was distilled and condensed in the condensate collector. The lower layer collected containing mainly epichlorohydrin was returned to the reaction vessel as soon as possible. Heating was continued for an additional hour after all the caustic was added. The pale yellow slightly viscous solution was separated from the salt (NaCl) by filtration. The salt was washed with a little benzene and filtered. Benzene, water and a large part of the unreacted epichlorohydrin in the combined filtrate were removed from the co-epoxy resin by distillation at 150° C. and 15 mm. pressure. The last traces of epichlorohydrin was removed by distillation at 165° C. and 2 mm. pressure. A pale yellow viscous liquid (146.8 g.) was obtained. It has an epoxy value of 0.40, epoxy equivalent per 100 grams of the viscous liquid and contains 1.82% Cl and no ash. One hundred grams of this viscous co-epoxy resin was mixed with 17 g. of menthane diamine and heated for two hours at 93° C. followed by four hours at 150° C. This cured thermosetting resin has an excellent heat distortion value of 156° C. and an outstanding solvent resistance. The percent of weight increase at room temperature in acetone, chloroform and 5% NaOH is 0.46 (8 days), 0.61 (7 days) and 1.40 (8 days) respectively.

*Example 2*

A mixture of bisphenol A (102 g.) and phenolphthalein (48 g.) in the molar ratio of 75 to 25 respectively was suspended in epichlorohydrin (333 g.) and placed in a 1-l. reaction flask equipped similarly as that in Example 1. An aqueous solution containing 48 g. of NaOH dissolved in 48 cc. of water was added to the reaction mixture and followed by 20 cc. benzene which was used as an azeotropic reagent to remove the last traces of water present in the reaction flask. The pale yellow viscous resin (185 g.) was separated from the reaction mixture by essentially the same procedure as that of Example 1. This co-epoxy resin has an epoxy value of 0.41 epoxy equivalent per 100 g. of resin. It contained 1.55% Cl and no ash. This resin was cured with equivalent amount of menthane diamine. A heat distortion value of 112° C. was obtained. The percent of weight increase at room temperature for eight days in acetone and in 5% NaOH is 12.2 and 0.31, respectively.

*Example 3*

A mixture of bisphenol A (13.5 g.) and phenolphthalein (106.5 g.) in the molar ratio of 15 to 85, respectively, was suspended in epichlorohydrin (363.6 g.). The reaction was carried out essentially the same as that of Example 1. An aqueous solution containing 32 g. of NaOH dissolved in 40 cc. of water was added during the course of 112 minutes. Heating was continued for an additional 25 minutes after all the caustic was added. The resin was separated from the salt (NaCl) and the excess epichlorohydrin essentially the same method as that in Example 1. It has an epoxy equivalent of 0.41, a M.P. of 32°–35° C. and a saponification value of 116 and an acid value <0.1. One hundred grams of the co-epoxy resin was mixed with 17.5 g. menthane diamine and heated for two hours at 92° C. followed by 16 hours at 150° C. The resulting thermosetting resin has an outstanding heat distortion value of 178° C.

*Example 4*

A mixture of phenolphthalein (95 g.) and diphenol sulfone (25 g.) in the molar ratio of 75 to 25, respectively, was suspended in epichlorohydrin (222 g.). The alkaline solution used contained 32 g. of NaOH in 32 cc. of water. Reaction was carried out essentially the same way as that in Example 2, except 20 cc. of toluene was used instead of benzene. A yellow solid resin (111.5 g.) was obtained. It has an epoxy equivalent of 0.37 per 100 g. of resin and contained 1.95% Cl. This co-epoxy resin was cured by using dianiline sulfone to a rigid thermosetting resin of good heat stability.

*Example 5*

A yellow solid co-epoxy resin (141 g.) was obtained by reacting a mixture of bisphenol A (21.7 g.) and o-cresol phthalein (98.3 g.) in the molar ratio of 25 to 75 respectively with epichlorohydrin (529 g.) in the presence of an alkaline solution containing 31 g. NaOH dissolved in 40 cc. of water. The reaction was carried out as that in Example 1. This co-epoxy resin has an epoxy equivalent of 0.39, a M.P. of 45–50° C. and a saponification value of 92.

*Example 6*

A mixture of bisphenol A (47.8 g.) and o-cresol phthalein (72.2 g.) in the molar ratio of 50 to 50 respectively was reacted with epichlorohydrin (583 g.) in the presence of an alkaline solution containing 34.3 g. of NaOH dissolved in 40 cc. of water. The resin (134.1 g.) isolated from this reaction mixture is a pale brown solid having an epoxy equivalent of 0.42 per 100 grams of solid.

*Example 7*

A mixture of bisphenol A (35.9 g.), phenolphthalein (66.77 g.) and hydroquinone (17.33 g.) in the molar ratio of 30:40:30 respectively was suspended in epichlorohydrin (727.5 g.). An alkaline solution containing 42.8 g. of NaOH dissolved in 50 cc. of water was dropped into the mixture. The temperature of the reaction was maintained between 108–118° C. A pale yellow viscous liquid (115.5 g.) was isolated from the reaction mixture similar to that in Example 1. It has an epoxy equivalent of 0.47 per 100 grams of resin.

*Example 8*

A mixture of phenolphthalein (78.8 g.) and diphenol sulfone (41.2 g.) in the molar ratio of 60 to 40 respectively was reacted with epichlorohydrin (381 g.) in the presence of an alkaline solution containing 34 g. NaOH dissolved in 45 cc. of water. The resin (142.2 g.) was isolated from the reaction essentially the same way as that of Example 1. It softens around 36° C. and has an epoxy equivalent of 0.39 per 100 grams of resin. One hundred grams of this resin was mixed with 17 g. of menthane diamine and heated for 2 hours at 93° C. followed by 16 hours at 150° C. The resulting thermosetting resin has a heat distortion value of 120° C.

*Example 9*

Following the same procedure outlined in Example 8, 105.5 g. of phenolphthalein and 14.5 g. of diphenol sulfone in the molar ratio of 85 to 15, were reacted with 361 g. of epichlorohydrin in the presence of an alkaline solution to produce 133 g. of epoxy resin. This resin softened at a temperature range of 35–38° C., and has an epoxy equivalent of 0.38 per 100 grams of resin.

*Example 10*

A mixture of phenolphthalein (99 g.) and 2.2′ methylene bis-(p-chlorophenol) (21 g.) in the molar ratio of 80 to 20 respectively was reacted with epichlorohydrin (360 g.) in the presence of an alkaline solution containing 31.7 g. of NaOH dissolved in 45 cc. of water. The resin (130.7 g.) isolated from the reaction mixture has an epoxy equivalent of 0.37 per 100 grams of solid and contains 5.38% Cl. It can be cured to a flexible thermosetting resin by using equivalent amount of dianiline sulfone.

The co-epoxy resins produced by this invention have wide application. For instance, they may be used as components or reactants in the manufacture of varnish compositions, potting compositions and casting resins. In varnish compositions, such resins are reacted with unsaturated fatty acids to form varnish esters.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. The method of manufacturing a curable epoxy resin containing glycidyl groups comprising reacting in an alkaline medium at a temperature between about 50 to 150° C. a halohydrin selected from the group consisting of epihalohydrins and polyhalohydrins with a phenol-condensation product, selected from the group consisting of phenolphthaleins, phenolmaleins, phenolsulfonephthaleins, phenolsucceins, and phenolnaphthaleins, and a dihydric phenol, the molar ratio of the halohydrin to the combined molar amount of the phenol-condensation product and dihydric phenol being at least 2:1, the reaction being free of substantial amounts of water which would cause significant hydrolysis of the glycidyl groups of said epoxy resin.

2. The method according to claim 1 wherein the phenol condensation product is a phenolphthalein.

3. The method according to claim 1 wherein the phenol condensation product is a phenolmalein.

4. The method according to claim 1 wherein the phenol condensation product is a phenolsuccein.

5. The method according to claim 1 wherein the phenol condensation product is a phenolnaphthalein.

6. The method according to claim 1 wherein the phenol condensation product is a phenolsulfonephthalein.

7. The method according to claim 1 wherein the dihydric phenol is selected from the group consisting of resorcinol, catechol, hydroquinone, bis-(4-hydroxyphenyl)-2,2-propane, 4,4′-dihydroxybenzophenone, bis-(4-hydroxyphenyl) - 1,1-ethane, bis-(4-hydroxyphenyl)-1,1-isobutane, bis - (4 - hydroxyphenyl-2,2-butane, bis-(4-hydroxy - 2-methylphenyl)-2,2-propane, bis-(4-hydroxy-2-tertiary-butylphenyl)-2,2-propane and bis-(2-hydroxynaphthyl)-methane, 1,5-dihydroxynaphthalene.

8. The method according to claim 1 wherein the phenol condensation product is phenolphthalein and the dihydric phenol is bis-(4-hydroxyphenyl)-2,2-propane.

9. An epoxy resin formed in accordance with the method of claim 1.

10. An epoxy resin formed in accordance with the method of claim 2.

11. An epoxy resin formed in accordance with the method of claim 3.

12. An epoxy resin formed in accordance with the method of claim 4.

13. An epoxy resin formed in accordance with the method of claim 5.

14. An epoxy resin formed in accordance with the method of claim 6.

15. An epoxy resin formed in accordance with the method of claim 7.

16. An epoxy resin formed in accordance with the method of claim 8.

References Cited in the file of this patent

UNITED STATES PATENTS 2,060,715    Arvin _____ Nov. 10, 1936